(12) United States Patent
Hiraiwa et al.

(10) Patent No.: US 8,516,209 B2
(45) Date of Patent: Aug. 20, 2013

(54) COMPUTER SYSTEM, STORAGE VOLUME MANAGEMENT METHOD, AND COMPUTER-READABLE STORAGE MEDIUM

(75) Inventors: Yuri Hiraiwa, Sagamihara (JP); Yoshinori Matsui, Yokohama (JP); Tetsuya Kaminaka, Yokohama (JP); Kenichi Oyamada, Yokohama (JP)

(73) Assignee: Hitachi, Ltd., Tokyo (JP)

(*) Notice: Subject to any disclaimer, the term of this patent is extended or adjusted under 35 U.S.C. 154(b) by 380 days.

(21) Appl. No.: 13/055,447

(22) PCT Filed: Oct. 8, 2010

(86) PCT No.: PCT/JP2010/067775
§ 371 (c)(1),
(2), (4) Date: Jan. 21, 2011

(87) PCT Pub. No.: WO2012/035669
PCT Pub. Date: Mar. 22, 2012

(65) Prior Publication Data
US 2012/0072687 A1    Mar. 22, 2012

(30) Foreign Application Priority Data

Sep. 16, 2010   (JP) ................. 2010-208163

(51) Int. Cl.
*G06F 12/02*    (2006.01)
(52) U.S. Cl.
USPC .......................................... 711/162; 711/170
(58) Field of Classification Search
USPC ................................ 711/162, 170
See application file for complete search history.

(56) References Cited

U.S. PATENT DOCUMENTS

| | | |
|---|---|---|
| 8,346,934 B2 * | 1/2013 | Okamoto et al. ............. 709/226 |
| 2006/0136633 A1 | 6/2006 | Harima et al. |
| 2006/0195667 A1 | 8/2006 | Nakano et al. |
| 2008/0222374 A1 * | 9/2008 | Hiraiwa et al. ............... 711/162 |
| 2009/0094403 A1 | 4/2009 | Nakagawa et al. |
| 2009/0144389 A1 | 6/2009 | Sakuta |
| 2010/0077162 A1 | 3/2010 | Kaneko et al. |
| 2010/0153947 A1 | 6/2010 | Haruma |

FOREIGN PATENT DOCUMENTS

| | | |
|---|---|---|
| JP | 2003-122509 | 4/2003 |
| JP | 2006-178720 | 7/2006 |
| JP | 2009-093316 | 4/2009 |

(Continued)

OTHER PUBLICATIONS

Parziale, Lydia et al.; Introduction to the New Mainframe: z/VM Basics; ibm.com/redbooks; Nov. 2007; pp. i-xviii and 1-444.
IBM; CP Programming Services, version 6 release 1; SC24-6179-00; 2009; pp. 175-186.

(Continued)

*Primary Examiner* — John Lane
(74) *Attorney, Agent, or Firm* — Foley & Lardner LLP

(57) ABSTRACT

A computer system in an embodiment comprises a storage apparatus, a host computer, and a copy control program. The storage apparatus performs copy operations of volumes allocated to a guest OS of the host computer. The copy control program obtains volume information of the guest OS from a VM control program at a given time. The control program compares the information with previous volume information of the guest OS and performs volume copy control for the guest OS in accordance with the comparison result. This process achieve appropriate copy operations even if the association relationship between the guest OS and volumes is changed during system operation.

15 Claims, 11 Drawing Sheets

(56) References Cited

FOREIGN PATENT DOCUMENTS

| | | |
|---|---|---|
| JP | 2009-140053 | 6/2009 |
| JP | 2010-079391 | 4/2010 |
| JP | 2010-140273 | 6/2010 |

OTHER PUBLICATIONS

PCT Search Report and Written Opinion on application No. PCT/JP2010/067775 dated Jan. 11, 2011; 7 pages, Not in the English language.

* cited by examiner

| GROUP ID | G1 |
|---|---|
| COPY TYPE | GROUPED ASYNCHRONOUS COPYING |
| PRIMARY VOLUME ID | SECONDARY VOLUME ID |
| A0001 | B0001 |
| A0002 | B0002 |

| GROUP ID | G2 |
|---|---|
| COPY TYPE | ASYNCHRONOUS COPYING |
| PRIMARY VOLUME ID | SECONDARY VOLUME ID |
| A0001 | C0001 |
| A0002 | C0002 |

| GROUP ID | G3 |
|---|---|
| COPY TYPE | SYNCHRONOUS COPYING |
| PRIMARY VOLUME ID | SECONDARY VOLUME ID |
| B0001 | C0001 |
| B0002 | C0002 |

*FIG. 4*

| DISK SUBSYSTEM NO. | | 1 |
|---|---|---|
| VOLUME NO. | VOLUME ID | VOLUME LABEL |
| 00 | A0001 | AAAAAA |
| 01 | A0002 | BBBBBB |
| 02 | B0001 | CCCCCC |
| ⋮ | ⋮ | ⋮ |

| DISK SUBSYSTEM NO. | | 2 |
|---|---|---|
| VOLUME NO. | VOLUME ID | VOLUME LABEL |
| 00 | C0004 | DDDDDD |
| 01 | B0002 | EEEEEE |
| ⋮ | ⋮ | ⋮ |

| GUEST NO. | | 1 | 541 |
|---|---|---|---|
| DEVICE ID | VOLUME LABEL | ATTRIBUTE | |
| A0001 | AAAAAA | POSSESSED | |
| A0002 | BBBBBB | POSSESSED | |
| C0004 | DDDDDD | TEMPORARY | |

COMPUTER SYSTEM, STORAGE VOLUME MANAGEMENT METHOD, AND COMPUTER-READABLE STORAGE MEDIUM

CROSS-REFERENCE TO RELATED PATENT APPLICATIONS

This application is a US National Phase application of PCT Application PCT/JP2010/067775 filed Oct. 8, 2010 which claims priority from Japan Application JP 2010-208163, filed Sep. 16, 2010. All of the aforesaid applications are incorporated herein by reference in their entirety as if fully set forth herein.

TECHNICAL FIELD

This invention relates to a computer system, a storage volume management method, and a computer-readable storage medium for storing a program for controlling copy operations in a storage apparatus and, in particular, relates to a copy control technique in a computer system.

BACKGROUND ART

For public or business infrastructure systems bearing social foundations, high availability has been desired. For this reason, in the data storage market, so-called Disaster Recovery System has been demanded that will not lose data even if a storage apparatus holding a huge amount of data were destroyed by disasters, for example.

As one of the techniques to meet to such a market request, a computer system has been provided that backups data using a remote copying technique. This computer system stores identical data into storage apparatuses placed at two sufficiently distant locations. When the data in either one of the storage apparatuses is updated, the update is synchronously or asynchronously reflected to the other storage apparatus by means of remote copying. Consequently, the identity of the data in the two storage apparatuses is secured.

To further improve the security of the data, PTL 1 discloses a storage system that provides storage apparatuses at three sufficiently distant locations from one other. In this computer system, the identity of the data between the first storage apparatus to be used in normal service and the second, remote storage apparatus is secured by synchronous remote copying. On the other hand, the identity of the data between the first storage apparatus and the third remote storage apparatus is secured by asynchronous remote copying.

As a technique to effectively utilize computer resources such as CPUs, memory devices, and storage apparatuses, system virtualization technique is disclosed in NPL 1 and NPL 2. According to this technique, a plurality of virtual machines (also referred to as guests) are provided on a physical computer and the physical computer can function as if a plurality of computers were working. This technique is utilized for effective use of surplus computer resources or server consolidation that integrates several hundreds of guests into a single high-performance computer.

A virtual machine is a server environment attained by software; a single OS runs on the virtual machine to allow applications to run. Accordingly, for data protection, a range in which data integrity is to be preserved is expected to include volumes used by a virtual machine. In other words, it is desired that a system virtualization program distinguish a group of volumes allocated to a virtual machine from a group of volumes allocated to other virtual machines and perform remote copying of the group of volumes.

CITATION LIST

[Patent Literature]
[PTL 1]
JP 2003-122509A
[Non Patent Literature]
[NPL 1]
IBM Redbook "Introduction to the New Mainframe: z/VM Basics" (IBM Docket No. SG24-7316-00, Nov. 2007)
[NPL 2]
IBM Manual "z/VM CP Programming Services version 6 release 1" (IBM Docket No. SC24-6179-00, 2009)

SUMMARY OF INVENTION

Technical Problem

Remote copying is a technique that copies data in a given volume to another given volume. Accordingly, in the case that a storage resource coupled to a physical computer is allocated to and used by a plurality of virtual machines by means of the system virtualization technique described in the background art, the association relationship between a volume and a virtual machine in operation may be changed because of reallocation.

If the change of the association relationship is ignored to continue a copy operation, a proper copy operation is disturbed. Also, if volumes in a storage subsystem are allocated to a plurality of virtual machines, the same problem will occur in copying within the storage subsystem.

Solution to Problem

A computer system of an embodiment of the present invention comprises a storage apparatus, a host computer which accesses volumes provided by the storage apparatus, and a management computer. The host computer executes a control program and a guest OS running on the control program. The guest OS accesses one or more volumes allocated from the storage apparatus. The storage apparatus performs copy operations of the one or more volumes allocated to the guest OS. One of the host computer and the management computer executes a copy control program for controlling copy operations by the storage apparatus. The one of the host computer and the management computer, in accordance with the copy control program, obtains first information indicating at least a part of one or more volumes allocated to the guest OS at a given time from the control program. The one of the computers, in accordance with the copy control program, compares the first information with second information indicating at least a part of one or more volumes having been allocated to the guest OS prior to the given time to check for a change in volume allocation to the guest OS and performs volume copy control for the guest OS in accordance with a result of the checking.

Advantageous Effects of Invention

According to an embodiment of this invention, in a computer system with virtual machines provided, proper copy operations can be achieved even if the association relationship between a virtual machine and a volume changes during system operation.

[BRIEF DESCRIPTION OF DRAWINGS]

FIG. 4 is a drawing illustrating a configuration of copy group information in the first embodiment.

FIG. 5 is a drawing illustrating a configuration of storage configuration information in the first embodiment.

FIG. 6 is a drawing illustrating a configuration of guest information in the first embodiment.

DESCRIPTION OF EMBODIMENTS

Hereinafter, embodiments of this invention will be described. For clarity of explanation, the following descriptions and accompanying drawings contain omissions and simplifications as appropriate. Throughout the drawings, like components are denoted by like reference signs and their repetitive explanation is omitted for clarity of explanation if not necessary.

First Embodiment

A first embodiment of this invention will be described with reference to FIGS. 1 to 11. This embodiment has a feature in controlling volume copy operations by a storage apparatus. The storage apparatus provides virtual machines working on a host computer with volumes. A copy control program checks for a change of volume allocation in controlling copying of a volume allocated to a virtual machine.

The control achieves proper copy operation in a computer system where virtual machines work even if the association relationships between the virtual machines and volumes are changed during system operation. In this embodiment, input and output control to and from a computer and the usage of the storage area on the basis of volumes in a storage apparatus are the same as those in the conventional art.

<System Configuration>

Figure 1:
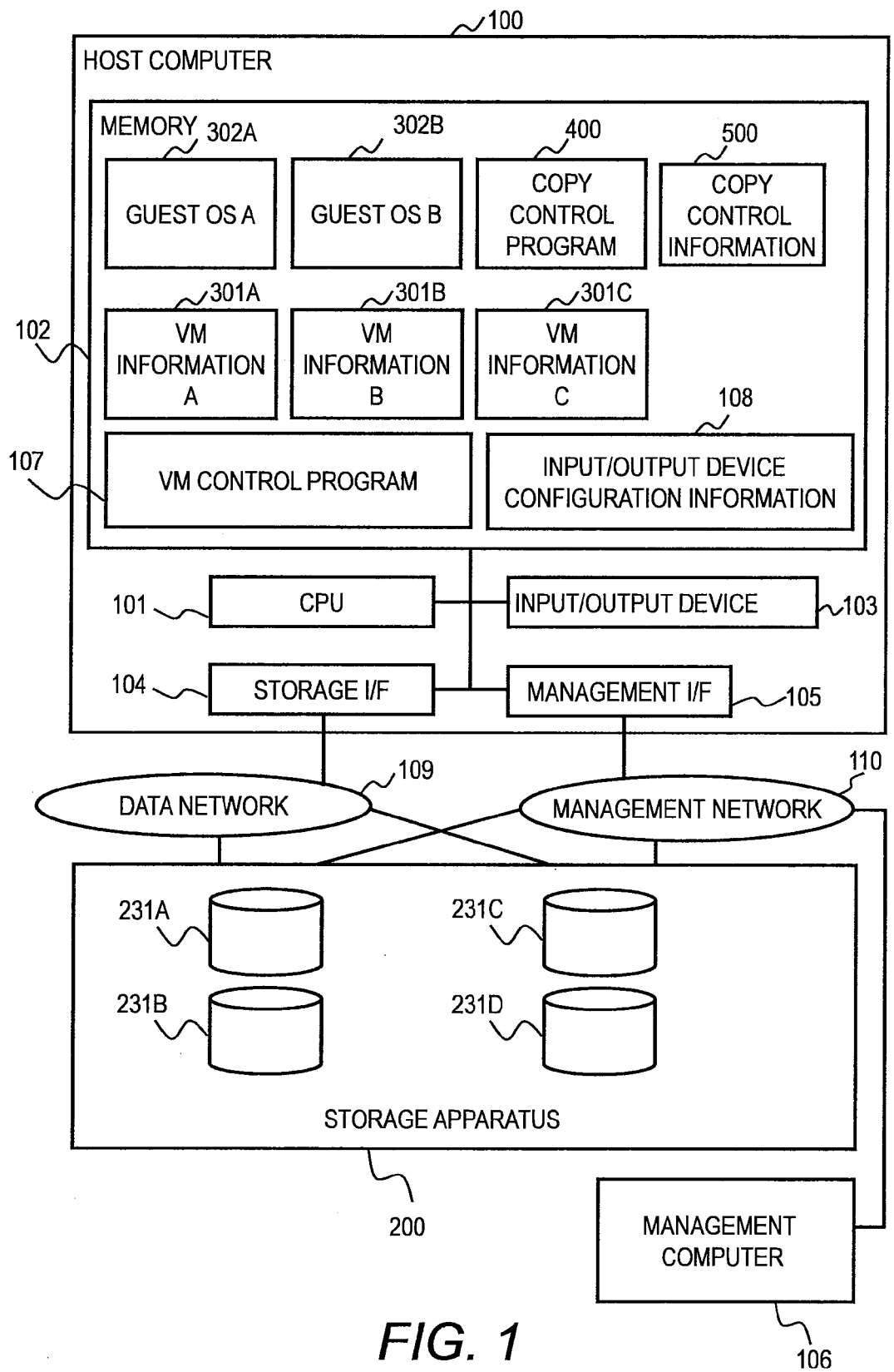
FIG. 1 is a drawing illustrating a configuration of a computer system in a first embodiment.

First, a system configuration in this embodiment will be described. FIG. 1 schematically illustrates a configuration of a computer system in this embodiment. The system comprises a host computer 10 and a storage apparatus 200 to be accessed by the host computer 10. The host computer 10 is coupled to the storage apparatus 200 by a data network 109. The system further comprises a management computer 106, and the host computer 100, the storage apparatus 200 and the management computer 106 are coupled to one another by a management network 110.

The host computer 10 is accompanied by a host computer input and output device 103, which is used for configuring at the host computer 10 mainly to manage the system operations. Similarly, the management computer 106 is accompanied by a management computer input/output device (not shown), which is used for configuring the system at the management computer mainly to manage the operation. The management computer 106 and the host computer 100 may be implemented in a computer.

Typical examples of the input/output device are a monitor, a keyboard, and a pointer device. The management computer 106 and the host computer 100 may be equipped with input/output devices other than these. For example, they may be equipped with a serial interface or an Ethernet interface, to which a monitoring computer may be coupled. The monitoring computer is equipped with input/output devices such as a monitor, a keyboard, and a pointer device. A user accesses the management computer 106 or the host computer 100 through the monitoring computer.

For clarity of explanation, the system in this configuration is comprised of a single storage apparatus 200 and a single host computer 100, but this invention can be applied to a computer system comprising a plurality of storage apparatuses and a plurality of host computers. The management system in this configuration example includes a management computer 106, but the management system may be composed of a plurality of computers. One of the plurality of computers may be a monitoring computer and a plurality of computers may deliver comparable performance to the management computer 106 for higher speed and higher reliability in executing management processes.

The data network 109 is a network for data communication and is a storage area network (SAN) in this configuration. The data network 109 may be a network other than SAN as far as it is a network for data communication. For example, it may be an IP network.

The management network 110 is a network for data communication and is an IP network in this configuration. The management network 110 may be a network other than the IP network as far as it is a network for data communication. For example, it may be SAN. The data network 109 and the management network 110 may be the same network.

The storage apparatus 200 provides volumes which are areas for storing data. The configuration example of FIG. 1 exemplifies four volumes 231A to 231D. The volumes 231A to 231D each store data written by the host computer 100. In this configuration example, copying is performed between two volumes. For example, for the storage apparatus 200 to copy data from the volume 231A to the volume 231B, the data written to the volume 231A is reflected to the volume 231B.

Two volumes can constitute a copy pair. The copy pair is composed of a copying source volume and a copying destination volume for storing a replica of the data stored in the copying source volume. In this description, the copying source volume is called a primary volume and the copying destination volume is called a secondary volume. A primary volume may be copied to a plurality of secondary volumes.

In the configuration example of FIG. 1, two volumes that constitute a copy pair exist in the single storage apparatus 200. Differing from this example, volumes that constitute a copy pair may exist in separate storage apparatuses. Volume copying for disaster recovery is typically performed between two remote storage apparatuses.

A copy operation performed between volumes may be synchronous or asynchronous. A copy operation may be performed within a storage apparatus or over a plurality of storage apparatuses. A synchronous copy operation notifies the host computer 100 of an I/O success after writing to the secondary volume has been completed (typically, after writing to a cache). An asynchronous copy operation notifies the host computer 100 of an I/O success after writing to the primary volume has been completed. The copy control of this embodiment may be applied to copying among three or more volumes. FIG. 1 shows volumes 231A to 231D in the storage apparatus 200 only. Details of the storage apparatus 200 will be described later.

As shown in FIG. 1, the host computer 100 comprises a CPU 101, a memory 102, an input/output device 103 such as a keyboard, a mouse, and a monitor, a storage I/F 104, and a management I/F 105 and they are coupled to one another. The storage I/F 104 is a network interface for coupling the host computer 100 to the data network 109. The storage I/F 104 transmits and receives data and control commands to and from the storage apparatus 200 via the data network 109.

The management I/F 105 is a network interface for coupling the host computer 100 to the management network 110. The management I/F 105 transmits and receives data and control commands between the storage apparatus 200 and the management computer via the management network 110.

The memory 102 stores virtual machine (VM) information 301A to 301C, guest OSes 302A and 302B, a copy control program 400, a VM control program 107, input/output device configuration information 108, and copy control information 500. The VM information 301A to 301C each contain management information of virtual machines working on the host computer 100 (VM control program 107).

The guest OSes 302A and 302B are each operating systems running on different virtual machines. These include OS environmental information on the virtual machines. The virtual machines of the guest OSes 302A and 302B run are the same as the virtual machines of the VM information 301A and 301B, respectively.

The guest OSes 302A and 302B use functions of the VM control program 107 in writing and reading data to and from the storage apparatus 200. The guest OSes 302A and 302B send requests to the VM control program 107 to read data from or write data to the volumes 231A to 231D. The configuration example of FIG. 1 includes two guest OSes 302A and 302B and VM information 301A to 301C of three virtual machines, but the number of these may be other different numbers.

The VM control program 107 is a control program for managing the whole virtual system. The VM control program 107 creates VM information of each virtual machine and deletes it. The VM control program 107 includes a function of, according to a request from a guest OS, locating a target device for an input or output from the input/output device configuration information 108 and of inputting/outputting data to/from the storage apparatus 200 as a part thereof. Moreover, it includes a function of allocating a real resource in the computer system to a pair of VM information and a guest OS to lead each virtual machine to work.

The copy control program 40 works as a program on a virtual machine. The copy control program 40 performs copy control according to a copy operation procedure. Furthermore, it transmits copy control commands to a storage micro-program 226 (refer to FIG. 2) for copy control. In response to the requests, the storage micro-program 226 carries out operations such as creating pairs and obtaining state information. Copy control information 50 contains information for the copy control program 40 to perform copy control. Details of copy control will be described later.

The guest OSes 302A and 302B, the copy control program 400, and the VM control program 107 are executed by the CPU 101. The CPU 101 obtains commands included in programs on the memory 102 and carries out operations corresponding to the commands. The CPU 101 obtains data on the memory 102 in accordance with a command of a program and stores the computed data into the memory 102.

In the configuration of FIG. 1, at least a part of the programs and information stored in the memory 102 may be stored in a different storage device. For example, the host computer 100 may have an external storage device such as a magnetic disk or a flash memory and may store a part of the programs and information therein. In this embodiment, a data storage area for storing data (including programs) to be processed by the CPU 101 may have any configuration. The hardware configuration of the management computer 106 may be the same as that of the host computer 100. In this configuration example in which the management computer 106 is not coupled to the data network 109, the storage I/F is not necessary.

Figure 2:
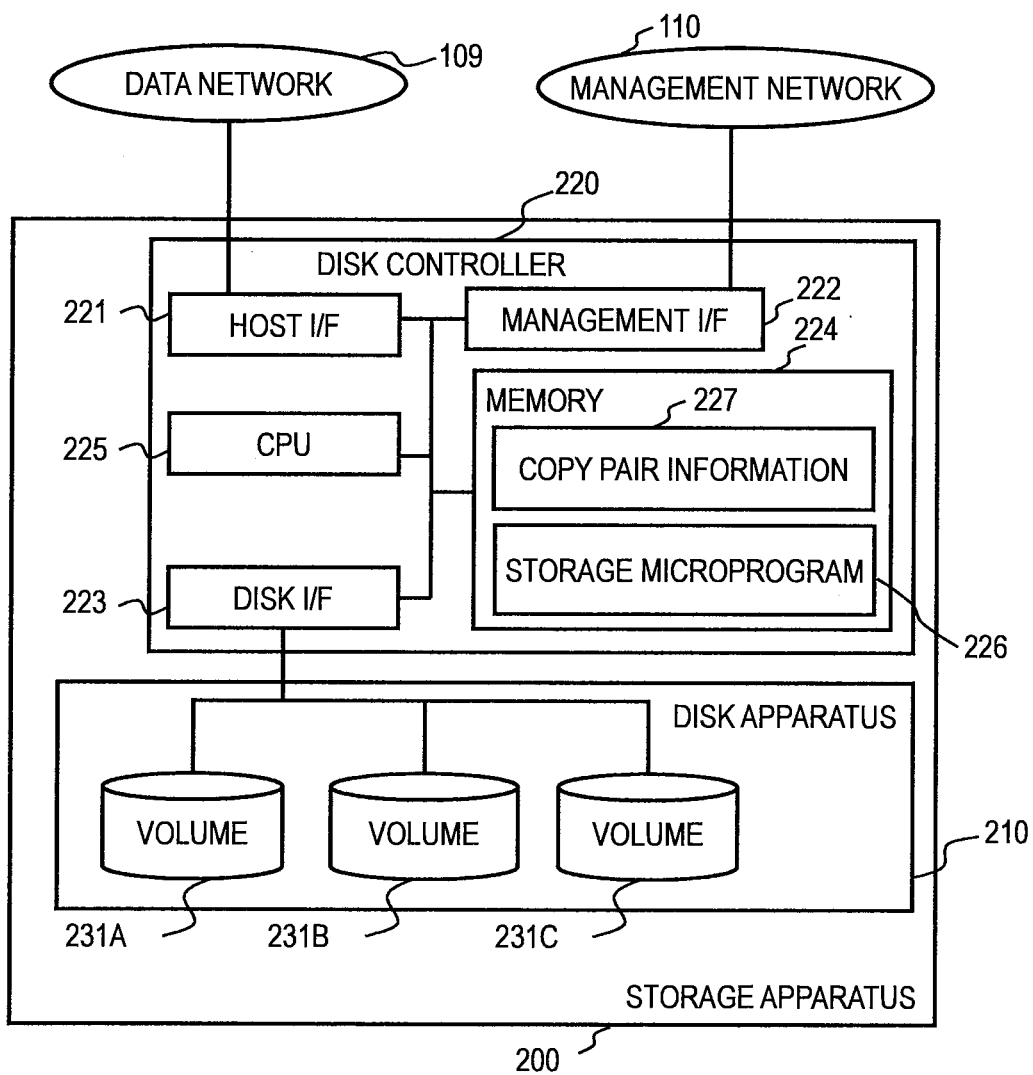
FIG. 2 is a drawing illustrating a configuration of a storage apparatus in the first embodiment.

FIG. 2 is a block diagram schematically illustrating a configuration of the storage apparatus 200. The storage apparatus 200 comprises a disk apparatus 210 and a disk controller 220. The disk apparatus 210 stores data which the host computer 100 has requested to write. The disk controller 220 controls operations of the storage apparatus 200.

The disk apparatus 210 includes a plurality of volumes. FIG. 2 exemplifies three volumes 231A to 231C. The number of volumes depends on the system configuration. A volume is a storage area and includes physical storage areas of one or more storage devices. Typically, a volume is associated with a physical memory area or a logical storage area (logical device) in a storage device such as a hard disk drive or a flash drive. The storage apparatus 200 may use a virtual volume. This embodiment may use any kind of volume.

The disk controller 220 comprises a host I/F 221, a management I/F 222, a disk I/F 223, a memory 224, and a CPU 225. The memory 224 holds a storage micro-program 226 and copy pair information 227. For the memory 224 and the CPU 225, the same explanation as for the CPU 101 and the memory 102 in the host computer 100 can be applied.

The storage micro-program 226 is executed by the CPU 225. The storage micro-program 226 running on the CPU 225 performs a copy operation between a copy pair of volumes in accordance with preset control information. The storage micro-program 226 further controls copy pairs in response to a request from the host computer 100.

Process examples of the copy control that is performed by the storage micro-program 226 are creating, suspending, resynchronizing, deleting of a pair, and obtaining of the state. The host computer 100 can request for any one of these processes to the storage micro-program 226. These are examples of processes in copy control and the storage apparatus 200 may perform operations different from these.

In the copy pair creating process, the storage micro-program 226 newly creates a copy pair. The suspending process temporarily stops copying data from the primary volume to the secondary volume. When receiving a command for the suspending process, the storage micro-program 226 does not reflect change of data in the primary volume to the secondary volume thereafter. In an example, after the storage micro-program 226 has copied the latest update of the primary volume to the secondary volume, it stops copying data between the two volumes.

The resynchronizing process synchronizes the primary volume with the secondary volume to make the data in the secondary volume identical to the data in the primary volume. In an example of the resynchronizing process, after the storage micro-program 226 makes two volume data identical to each other, it resumes a copy operation therebetween. The pair deleting process releases the pair in the creating process.

When receiving a request for the state obtaining process, the storage micro-program 226 sends state information on the copy pair to the host computer 100. The state information on the volumes that constitute copy pairs in the volumes included in the storage apparatus 200 is contained in the copy pair information 227.

Examples of the state of a copy pair are a copy pair state in which an update of the primary volume is reflected to the secondary volume, a suspended state in which a copy operation is suspended, an error state in which copying is disabled by communication trouble, for example, a single state in which a pair is not configured, and the like. When the storage micro-program 226 executes the creating process, the resynchronizing process, or the suspending process, it updates the copy pair information table 227. In addition, it may send the information on copy pair state to the host computer 100 as the process result.

In this configuration example, the storage micro-program 226 and the copy pair information 227 are stored in the memory 224 in the disk controller 220 but may be stored in other storage device. For example, the storage micro-program 226 and the copy pair information 227 may be stored in a flash memory coupled to the disk controller 220 or in a volume provided in the disk apparatus 210. The storage area for storing data (including programs) to be used by the CPU 225 may have any configuration.

The host I/F 221 is a network interface for coupling the storage apparatus 200 to the data network 109. The host I/F 221 transmits and receives data and control commands to and from the host computer 100 via the data network 109.

The management I/F 222 is a network interface for coupling the storage apparatus 200 to the management network 110. The management I/F 222 transmits and receives data and control commands to and from the host computer 100 and the management computer 106 via the management network 110. The disk I/F 223 is an interface for connecting the disk controller 220 to the disk apparatus 210.

<Copy Control Information>

Figure 3:
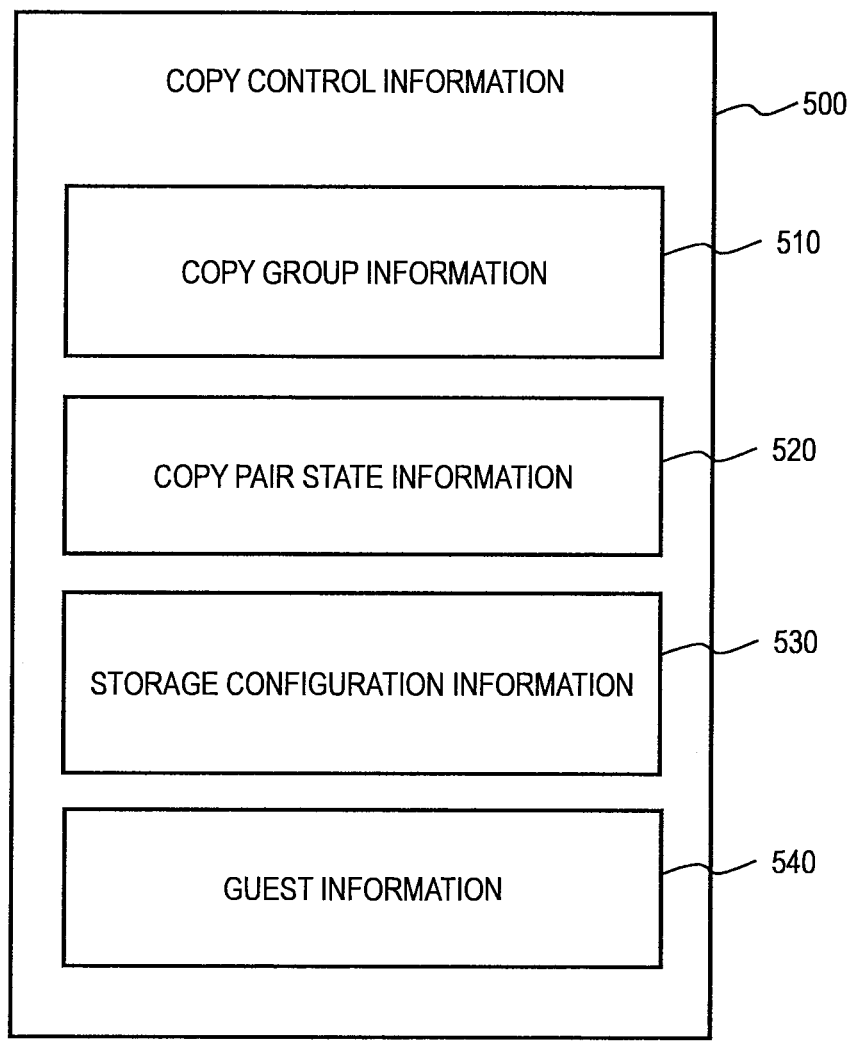
FIG. 3 is a drawing illustrating a configuration of copy control information in the first embodiment.

Hereinafter, copy control in this embodiment will be described in detail. FIG. 3 illustrates a configuration of the copy control information 500 in FIG. 1. The copy control program 400 performs copy control using the copy control information 500.

In this embodiment, information stored in a data storage area (for example, copy control information 500) does not depend on data structure and may be expressed in any data structure. For example, a data structure appropriately selected from tables, lists, databases, and queues can store information.

As illustrated in FIG. 3, the copy control information 500 comprises copy group information 510, pair state information 520, storage configuration information 530, and guest information 540. The details of the copy group 510 will be described later with reference to FIG. 4. The details of the storage configuration information 530 will be described later with reference to FIG. 5. The details of the guest information 540 will be described later with reference to FIG. 6.

The state information which is obtained as a result of a pair state obtaining command issued by the copy control program 400 to the storage apparatus 200 is included in the pair state information 530. For this reason, the pair state information 530 contains information on the respective copy pair states of the copy pairs contained in the copy pair information 227 held in the storage apparatus 200. The copy control program 400 refers to the copy pair information 227 to present a user with the states of copy pairs and performs copy control depending on the states of copy pairs.

FIG. 4 illustrates a configuration example of copy group information 510 in FIG. 3. The copy group information 510 is information on copy groups and, specifically, is information on primary volumes which constitute copy groups and secondary volumes which constitute pairs with the primary volumes. A user configures the information through the input/output device 103 or the management computer 106.

The copying function of the storage apparatus 200 includes a grouping function. For example, in an asynchronous copy operation, the storage apparatus 200 sequentially selects primary volumes one by one from a target group and performs a copy operation of the selected primary volumes (reflecting updates in the primary volumes to the secondary volumes). The storage apparatus 200 performs copying for keeping integrity; for example, it copies data to the secondary volumes in the order of writing to the volumes in the group.

A copy group is preferably composed of all of the primary volumes allocated to a virtual machine. The storage apparatus 200 performs copy operations for each copy group. It achieves efficient copy control and secure preservation of data integrity within the copy group. The number of primary volumes included in a copy group may be one.

As illustrated in FIG. 4, the copy group information 510 comprises a group identifier 5101, a copying type 5102, primary volume identifiers 5103, and secondary volume identifiers 5104 for each copy group. The example of FIG. 4 shows three copy groups G1 to G3; the item names of the group G1 are denoted with reference signs for exemplification purposes.

A group identifier 5101 identifies a copy group. A copying type 5102 identifies the type of copy mode, such as synchronous copying and asynchronous copying. A primary volume identifier 5103 and a secondary volume identifier 5104 identify a primary volume and a secondary volume, respectively, which constitute a copy pair. The volume identifiers identify the corresponding storage apparatus and volumes in the storage apparatus.

In the example shown in FIG. 4, there exist three copy groups G1 to G3. For example, there are two pairs in the copy group G1. One of the pairs consists of a primary volume with a volume identifier A001 and a secondary volume with a volume identifier B001. The other pair consists of a primary volume with a volume identifier A002 and a secondary volume with a volume identifier B002.

FIG. 5 illustrates a configuration example of the storage configuration information 530 in FIG. 3. The storage configuration information 530 is information on volumes in storage apparatuses (disk subsystems). Specifically, the storage configuration information 530 comprises a disk subsystem number 531, volume numbers 532, volume identifiers 533, and volume labels 534 for each disk subsystem. FIG. 5 exemplifies configuration information of two storage apparatuses (disk subsystems). The storage configuration information 530 associates these with one another. Although FIG. 1 exemplifies one storage apparatus 200, the computer system in this embodiment may comprise any number of storage apparatuses.

A disk subsystem number 531 is an identifier of a storage apparatus. A volume number 532 is information for identifying a volume in the storage apparatus. Volume identifiers 533 are the same as the volume identifiers in the copy group information 510.

A volume label 5304 is an identifier for identifying a volume appointed by a user. Volume identifiers and volume labels are contained in the input/output device configuration information 108. The host computer 100 can learn the volume identifier, the volume label, the storage apparatus, and the volume number of a certain volume with reference to the storage configuration information 530.

FIG. 6 illustrates a configuration example of the guest information 540 in FIG. 3. FIG. 6 exemplifies information on a guest. As shown in FIG. 1, in a configuration in which a plurality of guests (virtual machines) are working, the guest information 540 includes information on the plurality of guests. The guest information 540 comprises a guest number 541, volume identifiers 542, volume labels 543, and attributes 544 for each guest.

A guest number 541 is information for identifying a virtual machine which is a guest. A set of a volume identifier 542, a volume label 543, and an attribute 544 is information on a volume allocated to the virtual machine having a guest number 541 associated therewith. The guest information 540 indicates the volume identifier, volume label and attribute of each of the volumes allocated to each guest.

The volume identifiers 542 are the same as the volume identifiers in the copy group information 510 and in the storage configuration information 530. The volume labels 543 are the same as the volume labels in the storage configuration information 530. An attribute 544 is information for indicating whether the allocation of the associated volume to the guest may be changed or not during system operation. The attribute information will be described later in detail.

<Preparing of Copy Control Information>

Hereinafter, preparing (obtaining) of the copy control information 500 to be used by the copy control program 400 will be explained. The copy control information 500 is prepared in a system development phase or a system management phase. Specific information may be updated in a system operation phase. This process uses an API (Application Program Interface) in the VM control program 107. Hence, the API will be explained first.

Figure 7A:
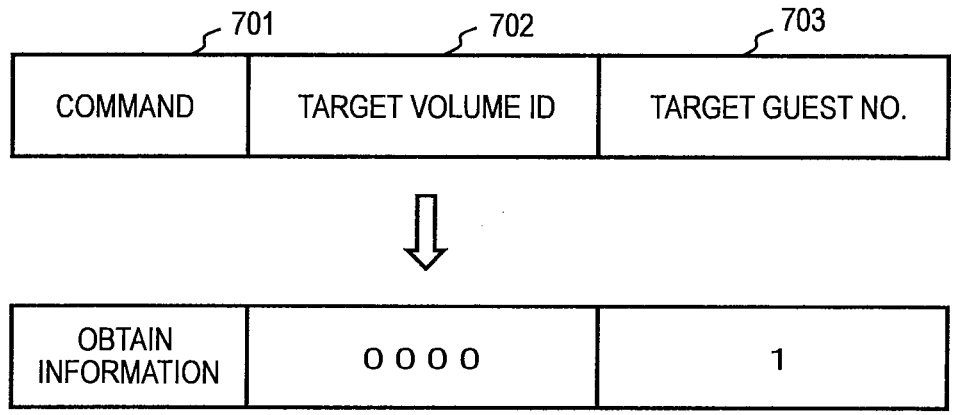
FIG. 7A is an explanatory diagram of an API provided by a VM control program in the first embodiment.
Figure 7B:
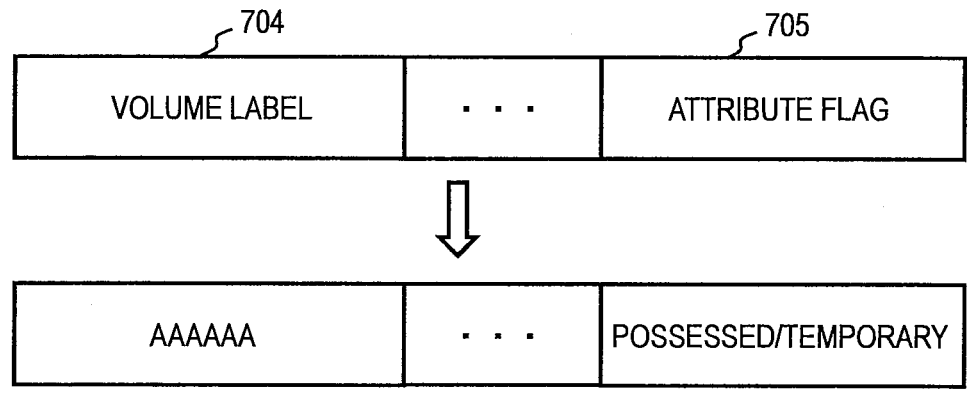
FIG. 7B is an explanatory diagram of an API provided by a VM control program in the first embodiment.

FIGS. 7A and 7B are explanatory drawings of an API which is provided to a user or a program by the VM control program 107. The VM control program 107 refers to the input/output device configuration information 108 and the VM information 301 according to an input from the copy control program 400 to obtain necessary information. Then, it sends the obtained information to the copy control program 400.

An input to the API includes, as illustrated in FIG. 7A, fields of a command 701, a target volume identifier 702, and a target guest number 703. In this example, the command 701 is a command to obtain volume information. The target guest 703 indicates a target guest for obtaining the volume information. The target volume identifier 702 is an identifier to identify a target volume, on which the command requests to obtain information, in the volumes allocated to the target guest 703.

An output in response to the input includes, as illustrated in FIG. 7B, a volume label 704 and an attribute flag 705. The volume label 704 indicates the volume label allocated to the volume identifier appointed by the input. The attribute flag 705 indicates the allocation mode of a volume appointed by the input to a virtual machine indicated by the guest number.

Specifically, in this embodiment, a volume has either one of two attributes. One attribute is "possessed" and the other one is "temporary". The attribute flag 705 indicates "possessed" or "temporary" (possessed/temporary).

A virtual machine (guest) to which a volume having the attribute "possessed" has been allocated keeps the right to possession of the volume. While the virtual machine is working, it is prohibited to change the allocation of the volume to the virtual machine and the association relationship therebetween will not be changed. The allocation of a volume having the attribute "temporary" may be canceled in accordance with an instruction of a user while the virtual machine is working. The user (the computer system) can reallocate the volume whose allocation to a certain virtual machine has been canceled to another volume. In this way, the right to possession of a volume having the attribute "temporary" may be changed while virtual machines are working.

Hereinafter, the preparing (obtaining) process of the copy control information 500 which is used by the copy control program 400 in its copy control will be explained in detail. The copy control program 400 refers to the copy group information 510, the storage configuration information 530, and the guest information 540 to check for change of volume allocation in the copy control process. Hereinafter, the preparing of the information will be described in detail.

As explained with reference to FIG. 4, the copy group information 510 is configured by a user (including by a program created by a user) through the input/output device 103 or the management computer 106. Hereinafter, the preparing process of the storage configuration information 530 shown in FIG. 5 and the guest information 540 shown in FIG. 6 will be described in detail.

Figure 8:
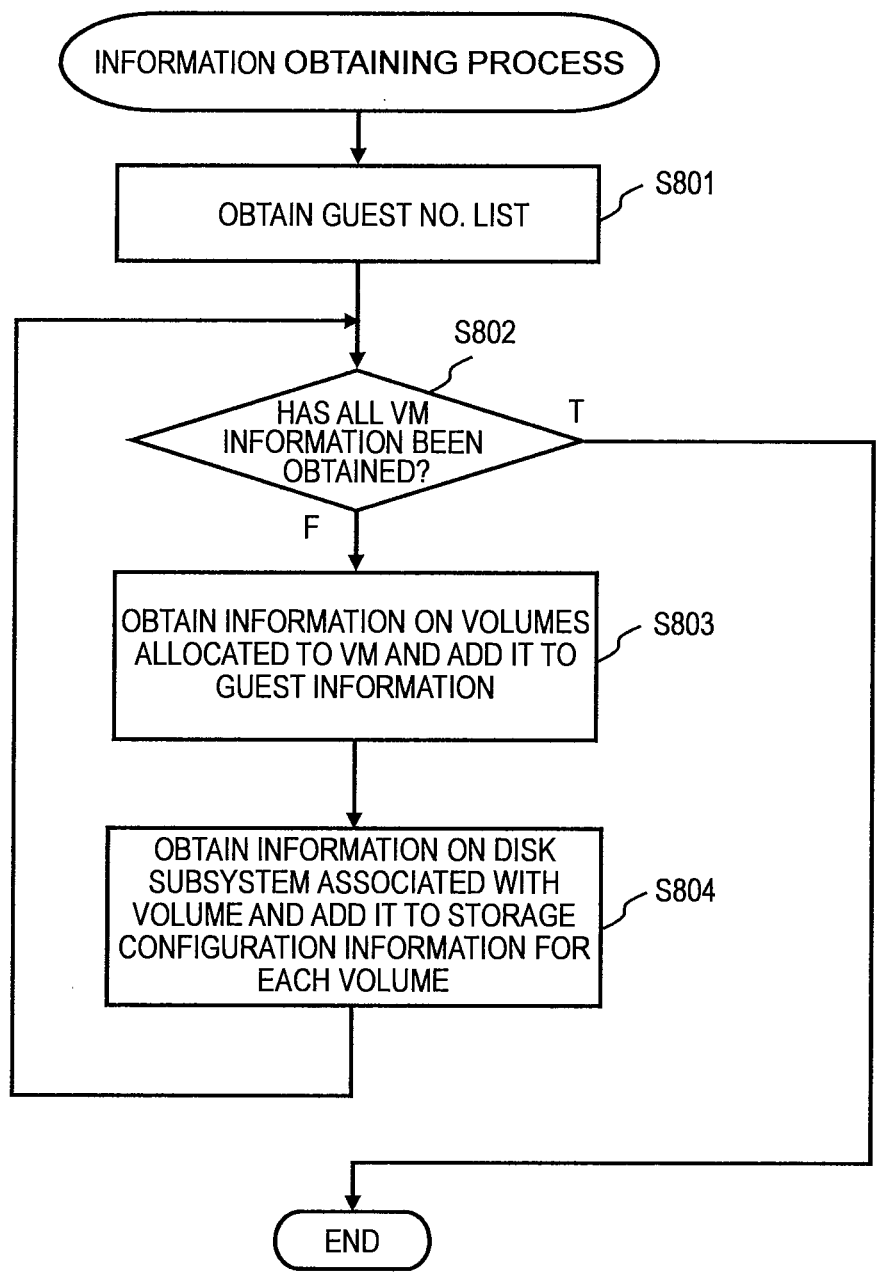
FIG. 8 is a flowchart illustrating a procedure that a copy control program prepares storage configuration information and guest information in the first embodiment.

FIG. 8 is a flowchart illustrating a procedure of preparing the storage configuration information 530 and the guest information 540 executed by the copy control program 400. The copy control program 400 uses the API illustrated in FIG. 7 to perform this process.

The copy control program 400 obtains a list of guest numbers (the numbers of virtual machines) using the API provided by the VM control program 107 (S801). The VM control program 107 can VM information 301C to prepare this list with reference to the VM information 301A.

Next, it obtains information on virtual machines identified by the guest numbers in the list obtained at the step 801. Specifically, the copy control program 400 determines whether or not the information obtaining process at step 803 and step 804 has been completed for each guest number (S802). If the determination at the step 802 is true, the copy control program 400 ends the process.

If the determination at the step 802 is false, it continues the process to obtain the volume information on a virtual machine. At step 803, the copy control program 400 obtains the information on the volumes allocated to the virtual machine and prepares the guest information 540.

Specifically, it specifies a guest number and all possible values which the volume identifiers intended to be managed may take in the API shown in FIG. 7. As a result, the copy control program 400 obtains information on the volumes which have been allocated to the specified virtual machine and are intended to be included in the specified management target.

The copy control program 400 adds the obtained volume identifiers 702 to the guest information 540 of the associated guest number 5401 as entries of the volume identifier 5402 (the data indicating the volume identifiers). In the same way, it adds the obtained volume labels 704 as entries of the volume label 543 and the attribute flags 705 as entries of the attribute 544 to the guest information 540.

Next, at step 804, the copy control program 400 obtains information on the storage apparatus (the disk subsystem) associated with the volumes allocated to the target virtual machine from the storage apparatus and prepares the storage configuration information 530. If the computer system includes a plurality of storage apparatuses, the copy control program 400 issues a command to obtain information to each storage apparatus.

The process of obtaining information from the storage apparatus 200 will be explained in detail. The copy control program 400 issues a command to obtain information to the storage apparatus 200 while specifying each entry of the volume identifiers 5402 included in the guest information 540 obtained at the step 803.

The copy control program 400 obtains information on the volumes included in the storage apparatus 200 from the storage apparatus 200. It adds the disk subsystem number of the storage apparatus 200 to the storage configuration information 530 as an entry of the disk subsystem number 5301. Furthermore, it adds an entry of the volume identifier 5402, an entry of the associated volume number 5302 and an entry of the associated volume label 5403, the information of which has been able to be obtained from the storage apparatus 200.

The copy control program 400 executes the steps 803 and 804 on all the guest numbers obtained at the step 801 (S802 to S804). When the steps 803 and 804 on all the guest numbers have been completed, the process for preparing the storage configuration information 530 and the guest information 540 ends.

Figure 9:
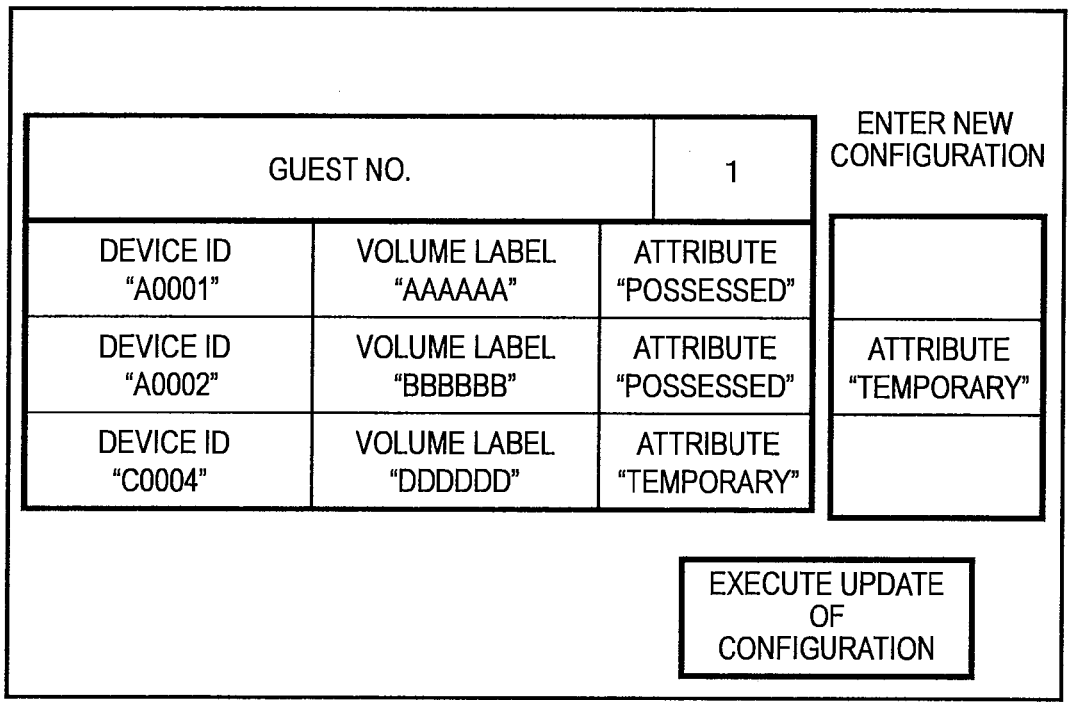
FIG. 9 is a drawing illustrating a GUI in the case that the administrator changes an attribute of guest information in the first embodiment.

As explained with reference to FIG. 7B, the attribute of a volume is to define the relationship between a virtual machine and a volume. Accordingly, it is preferable that a user (or a program created by a user) can set the attribute of each volume in accordance with the purpose of the computer system. FIG. 9 shows an example of a graphical user interface (GUI) to change the attribute 544 in the guest information 540 by a user's input using an input/output device in the management computer 106.

The user (administrator) can set the attribute of a volume through the GUI shown in FIG. 9. Specifically, the user specifies the volume whose attribute the user wants to change with the guest number of the virtual machine and the volume identifier or the volume label and enters a new attribute at the corresponding entry field of a new configuration. If a user click of the execution button for updating the configuration reflects the new attribute to the volume.

<Copy Control Process>

Hereinafter, a flow of the copy control process using the copy control information 500 by the copy control program 400 will be explained. When the copy control program 400 receives a copy control command from a user (including a program), it performs a copy control process in accordance with the command.

Figure 10:
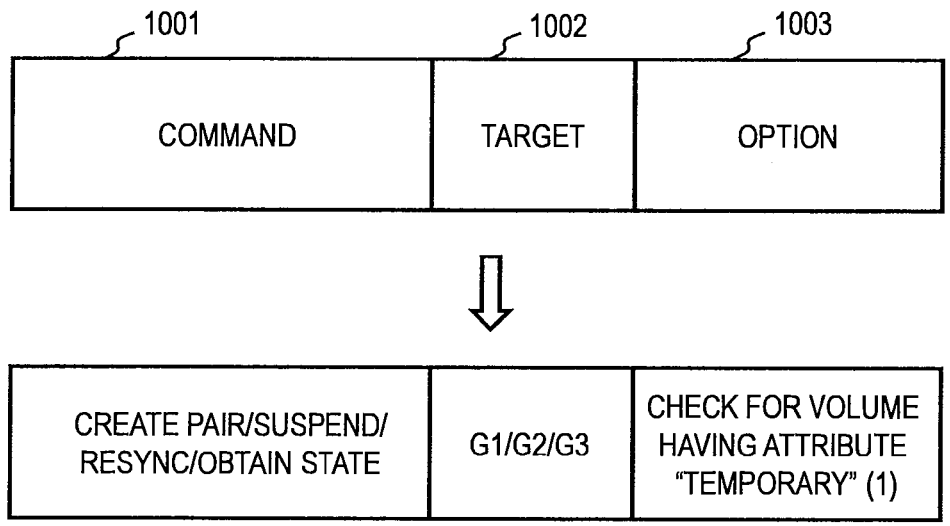
FIG. 10 is an explanatory diagram of a command line interface in the first embodiment.

FIG. 10 is an explanatory diagram of a command line interface provided by the copy control program 400 to a user (an input via an input and output device or a script program). The command line interface includes fields of a command 1001, a target 1002, and an option 1003.

In the field of the command 1001, a copy control command, such as "create a pair" or "obtain the state", is described. In the example of FIG. 10, any one of the commands of "create a pair", "suspend", "resynchronize", and "obtain the state" is described. In the field of the target 1002, a group or a pair which is to be the target of the command is described. In the example of FIG. 10, any one of the three groups G1 to G3 is described.

In the field of the option 1003, an option necessary to process the command is described, if any. In the option field 1003 in the example of FIG. 10, checking for the existence of a volume having the attribute "temporary" is indicated. The figure in the parenthesis in the field indicates the guest number. These commands and parameters may adopt various patterns in accordance with the copying function of the storage apparatus 200 other than those in the configuration illustrated by FIG. 10.

Next, a flow of a process of issuing command to the storage apparatus 200 by the copy control program 400 will be described. In the following process, it is assumed that a primary volume allocated to a virtual machine (guest) and a secondary volume associated therewith constitute a copy group.

Figure 11:
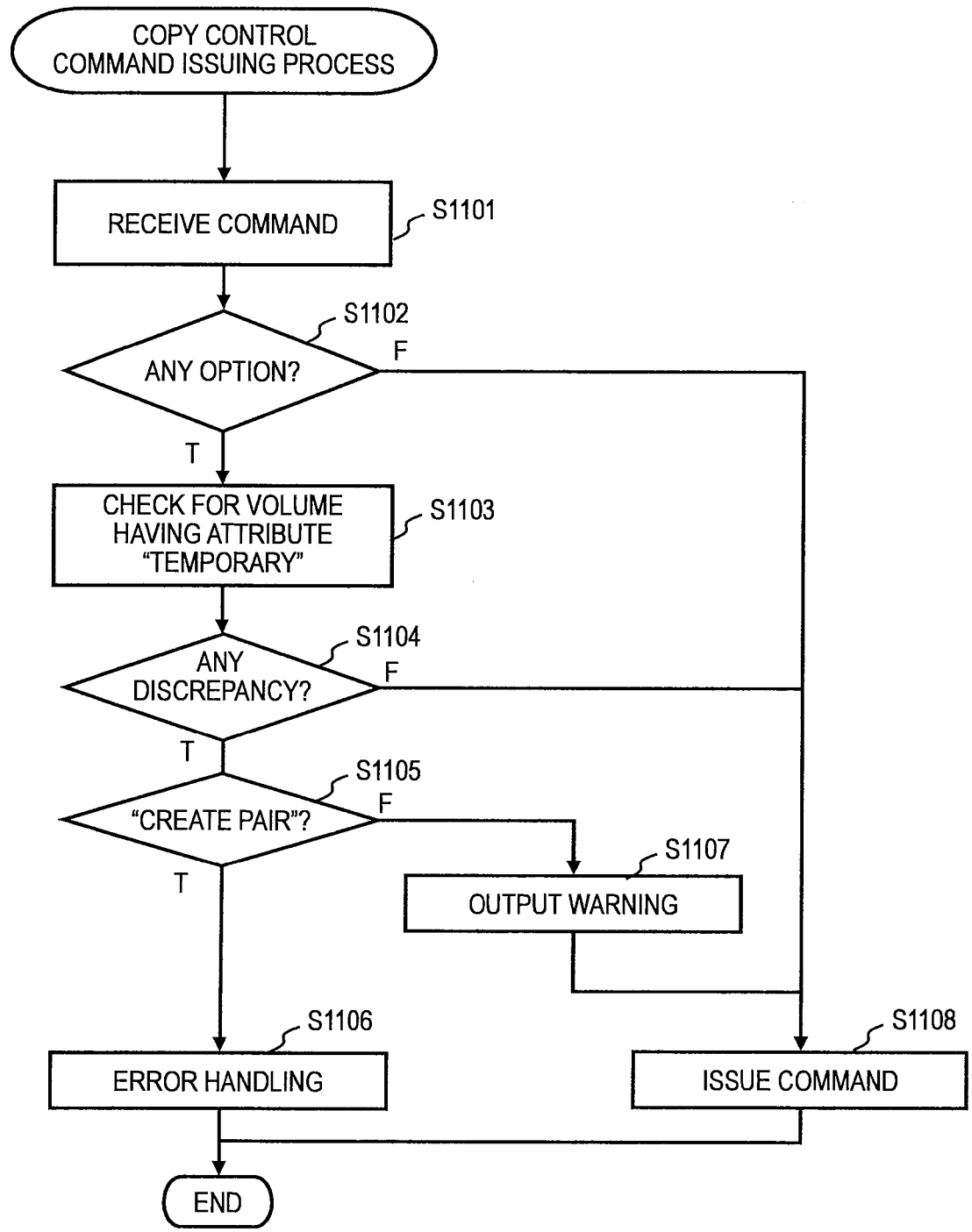
FIG. 11 is a flowchart illustrating a procedure that the copy control program checks configurations and issues a command in the first embodiment.

FIG. 11 is a flowchart illustrating a procedure of the issuing of a command. The copy control program 400 receives an instruction about copy control such as "suspend" or "obtain the state" (S1101). It determines whether or not the option "check for a volume having the attribute 'temporary'" is described in the received command line input (S1102). If the determination at the step 1102 is true, the copy control program 400 performs the steps as follows. It checks the appointed copy group for a volume having the attribute "temporary" (S1103).

Specifically, the copy control program 400 re-obtains the guest information 540 of the guest number appointed in the option together with "check for a volume having the attribute 'temporary'". The copy control program 400 can re-obtain (re-prepare) the guest information 540 according to the procedure illustrated with reference to FIG. 8.

The copy control program 400 compares the newly obtained guest information 540 and the copy group information 510 of the copy group appointed by the command. Specifically, it compares the list of identifiers of the volumes having the attribute "temporary" included in the guest information 540 and the list of the identifiers of the primary volumes having the attribute "temporary" included in the copy group information 510.

The copy control program 400 further compares the newly obtained guest information 540 and the storage configuration information 530. Specifically, it compares the volume labels associated with the identifiers of the volumes having the attribute "temporary" between the guest information 540 and the storage configuration information 530.

Next, the copy control program 400 determines whether or not any discrepancy exists between the current state indicated by the newly prepared guest information and the definition in the preliminarily prepared copy control information 500 as a result of the checking at the step 1103 (S1104).

Specifically, if the volume identifiers of the primary volumes contained in the two lists are different, the copy control program 400 determines that the current volume allocation to the target virtual machine is different from (does not agree with) the previous configuration registered in the copy control information 500 (T at S1104).

Meanwhile, if the volume labels are different, the copy control program 400 determines that the current volume allocation of the target virtual machine is different from (does not agree with) the previous configuration registered in the copy control information 500 (T at S1104). If the primary volume identifiers and the volume labels agree with the previous information, it determines the current configuration agrees with the setting definition (F at S1104).

If the determination result at the step 1104 is true, the copy control program 400 performs the following steps. It determines whether the indicated command is to create a copy volume pair or not (S1105). If the determination result at the step 1105 is true, it performs error handling and ends the copy control command issuing process (S1106). A notice of cancelation of command execution in the error handling corresponds to a warning.

If the determination result at the step 1105 is false, the copy control program 400 outputs a warning indicating a discrepancy (S1107) and proceeds to step 1108 to continue to perform the next step. If the determination result at the step 1102 is false, if the determination result at the step 1104 is false, or when the process at the step 1107 has been completed, the copy control program 400 issues a command to the storage apparatus 200 in accordance with the received command (S1108) to end the process. If the guest information 540 does not include a volume having the attribute "temporary", the determination result at the step 1104 should be false.

As described above, this embodiment checks for a change in the association relationship between virtual machines and volumes. Therefore, in a computer system in which the association relationship between volumes and virtual machines changes in operation because of reallocation, appropriate copy operation can be achieved. Besides, in data protection by means of volume copying in a virtual environment in which a number of virtual machines work, copy operations including a volume whose allocation may be changed from a virtual machine to another virtual machine can be achieved.

This embodiment, as explained with reference to FIG. 11, instructs to check, by (the option of) a copy control command, the allocated volumes to the virtual machine to which its target volume has been allocated. Accordingly, it is unnecessary to check the association relationship with (the allocation to) virtual machines on all of the volumes, so the amount of processes can be reduced. Furthermore, since it checks on the virtual machine to which the target volume of the copy control command belongs, volumes (virtual machine) to be checked can be selected properly.

In computer system operation, a volume may sometimes be temporarily allocated to a virtual machine for the contents to be checked. An operator (user) immediately reallocates the volume allocated to a virtual machine to another virtual machine. In this embodiment, since the user can instruct to check the volume allocation by a copy control command, this embodiment can avoid detecting a state in the course of manipulation by the operator but can check on the established steady association relationship.

Although the volume allocation check can preferably be instructed by a copy control command as described above, the copy control program 400 may perform the check of allocation relationship on all or a part of the volumes in response to a trigger event other than the copy control command or at a preset time. In such a configuration, too, it is preferable to obtain new guest information (information on the volumes allocated to virtual machines) in checking the volume allocation.

This embodiment provides a volume with an attribute of allocation ("possessed" or "temporary") to a virtual machine. Since it can fix the allocation of a desired volume to a virtual machine, unintentional lost of the volume data can be effectively prevented. As explained with reference to FIG. 11, this embodiment checks volumes having the attribute "temporary" only, so the amount of process in checking the volume allocation can be reduced.

The computer system may treat all of the volumes as volumes having the same attribute without assigning different attributes to volumes. The allocated virtual machines may be changed during system operation for all of the volumes. The copy control program 400 checks all of the volumes which have been allocated to virtual machines. The computer system may provide a volume with an attribute out of three or more kinds of attributes.

The process explained with reference to FIG. 11 checks for a discrepancy between volume lists (a difference in allocated volume) and a discrepancy between volume labels. In this way, it is preferable to check on at least two points for data protection, but the process may check on either one or other point than these to perform copy control.

As described above, in a preferred configuration, this embodiment defines a group composed of all volumes allocated to a virtual machine and performs a copy operation within the group as a unit. This configuration achieves preservation of data integrity and improvement in convenience in copy operations among the volumes in a virtual machine.

Since this embodiment checks volume allocation within a copy group, unnecessary copying of a volume with its allocation canceled or interruption of a copy operation caused by a volume with its allocation canceled can be prevented. Furthermore, copying a newly allocated volume can be performed properly.

It is preferable that the volumes allocated to a virtual machine constitute a copy group, but this invention is applicable to other configuration. For example, the volumes allocated to a virtual machine do not need to be the same as the volumes of a copy group. Otherwise, the computer system does not need to use copy groups.

In such configurations, the copy group information 510 cannot be used. For example, the copy control program 400 can detect a change in volume allocation to a virtual machine by comparing previous guest information with newly prepared guest information.

As in the above-described configuration, it is preferable that the copy control program 400 check all of the volumes having the attribute "temporary" in the volumes allocated to a virtual machine. This process properly achieves both of reduction in the amount of process and data protection by checking for a change of volume allocation. In particular, if the copy control command appoints a copy group, all the volumes having the attribute "temporary" are the target of the copying, so it is important to check those volumes.

The copy control program 400 may check for a change of allocation on only a part of the volumes which have been allocated to a virtual machine and have the attribute "temporary". Specifically, if the copy control command appoints a part of the pairs in a copy group, the copy control program 400 may check for a change of allocation on the pairs only. Conversely, it may include other volumes having the attribute "temporary" which the copy control command does not appoint into the target of the check for a change of allocation.

As indicated in FIG. 11, it is preferable that the computer system output a warning when volume allocation to a virtual machine has been changed. This allows a user to learn the change of volume allocation and the user can take appropriate responses. The method and the content of the warning depend on the design. The method of warning is arbitrary, but preferably, the warning indicates the volume with its allocation changed.

As indicated in FIG. 11, in this embodiment, if a copy control command is creation of a copy pair and volume allocation to a virtual machine has been changed, the copy control program 400 does not issue the command to the storage apparatus 200 and terminates the process. The operation can prevent unintended data corruption in a secondary volume caused by creating a new copy pair.

The process illustrated in FIG. 11 issues a command other than creating of a copy pair. However, it may cancel a part or all of the commands other than creating of a copy pair. If the design allows, the copy control program 400 may issue a command of creating a copy pair.

In this embodiment, the host computer 100 issues a copy control command to the copy control program 400, but instead, the management computer 106 may do it. The copy control program 400 may run on the management computer 106 instead of the host computer 100. These explanations added to this embodiment may be applied to other embodiment described below.

Second Embodiment

The first embodiment uses a grouping function included in the copying function of the storage apparatus 200 in copy operations in units of copy group. The host computer 100 registers volume pairs to constitute a copy group in the storage apparatus 200 and the storage apparatus 2000 gathers the volumes in a registered copy group to perform a copy operation.

This embodiment uses a copying function of the storage apparatus 200 in units of copy pair. The copy control program 400 defines a copy group which consists of one or more copy pairs and treats a copy group as an object of operation. The configuration of this embodiment is the same as that of the first embodiment except for the processes shown in the flowchart of FIG. 12.

Figure 12:
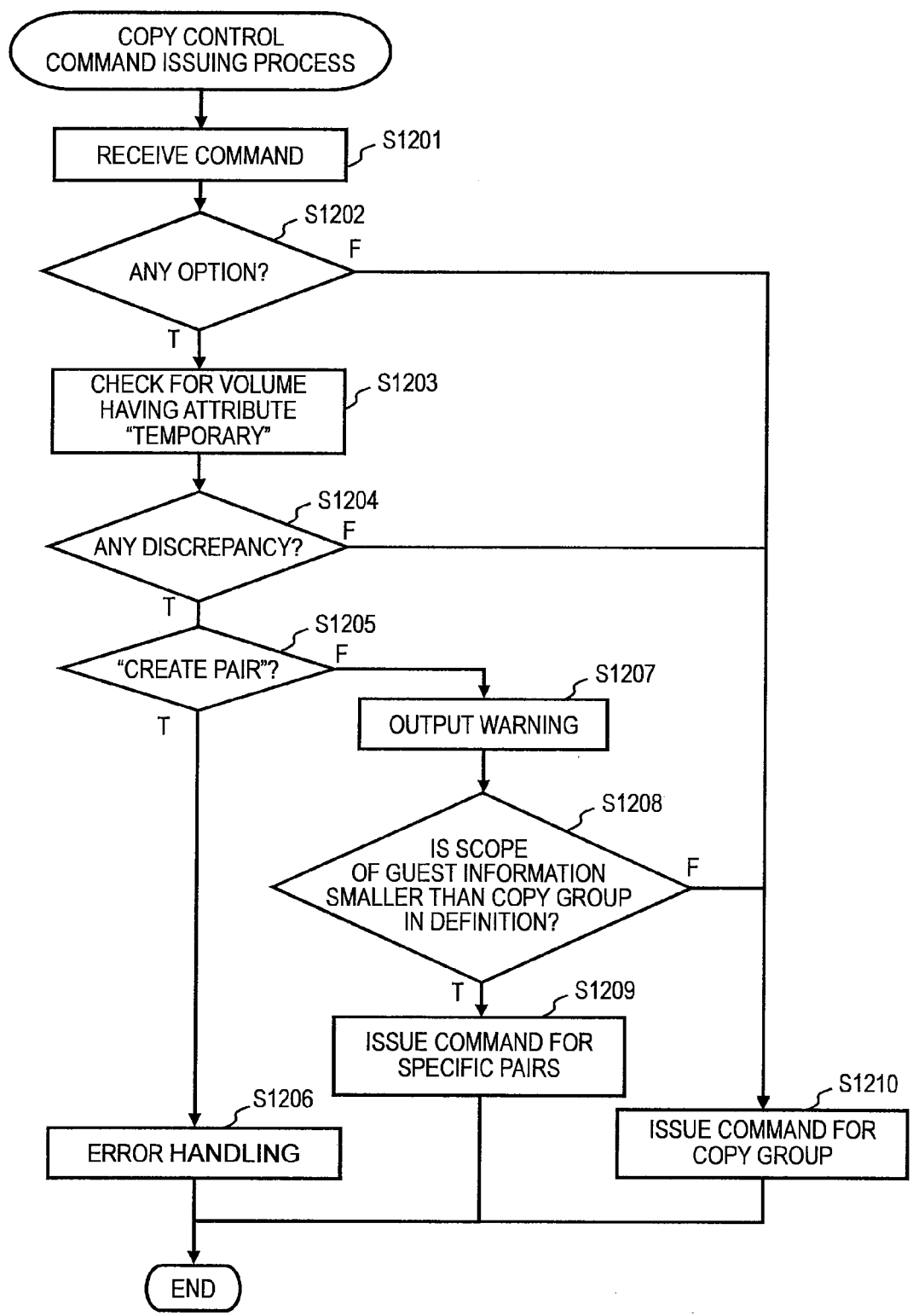
FIG. 12 is a flowchart illustrating a procedure that the copy control program checks configurations and issues a command in a second embodiment.

FIG. 12 is a flowchart illustrating a procedure of issuing a command by the copy control program 400 in this embodiment. This copy control program 400 obtains instructions concerning copy control, such as suspending or obtaining the state of pair (S1201). Next, it determines whether or not the received command line input indicates the option of "check for a volume having the attribute 'temporary'" (S1202).

It the determination at the step S1202 is true, the copy control program 400 performs the following processes. It checks the appointed copy group for a volume having the attribute "temporary" (S1203). Specifically, the copy control program 400 re-obtains the guest information 540 of appointed by the option together with "check for a volume having the attribute "temporary" and compares the obtained list of identifiers of the volumes and the list of the identifiers of the primary volumes having the attribute "temporary" included in the copy group information 510 corresponding to the copy group number appointed by the copy control command.

The copy control program 400 determines whether or not any discrepancy exists between the definition in the copy group information 510 and the current state indicated by the re-obtained guest information 540 in the result of the check at S1203 (S1204). If the determination at the step 1204 is true, it performs the following steps.

The copy control program 400 determines whether the indicated command is creating of a copy pair or not (S1205). If the determination at the step 1205 is true, it performs error handling (S1206) and terminates the copy control command issuing process. If the determination at the step S1205 is false, it outputs a warning indicating that there is a discrepancy (S1207) and proceeds to step S1208.

At the step 1208, the copy control program 400 determines whether the list of the primary volume identifier included in the copy group information 510 includes, in the check at the step 1203, a volume identifier different from those in the volume identifier list included in the re-obtained guest information 540.

If the determination at the step 1208 is true, the copy control program 400 issues a copy control command only on the volume identifiers included in the re-obtained guest information 540 to the storage apparatus 200 (S1209) since it might operate volumes allocated to other guest.

If the determination at the step 1202 is false, if the determination at the step 1204 is false, or if the determination at the step 1208 is false, the copy control program 400 issues a copy control command for all of the volumes in the copy group to the storage apparatus 200 as requested (S1210) and terminates the process.

This embodiment changes its behavior in the case that the scope of the definition of the copy group information includes more volumes than the volumes allocated to the associated virtual machine, in addition to the case that the received command is creating of a copy pair. This configuration prevents, when a copy pair belongs to two copy groups, an operation for one of the copy groups from stopping a pair created in the other copy group, and other operational problems in copy operations.

As set forth above, this invention has been explained in detail with reference to the accompanying drawings. However, this invention is not limited to such specific configurations but includes various modifications and equivalent configurations within the scope of the accompanying claims.

For example, in the above-described embodiments, a configuration in which a plurality of virtual machines of guests are provided on a VM control program of a hypervisor has been described as an implementation example of system virtualization technology. Unlike this, the computer system may operate a virtualized program on a normal OS to provide a plurality of virtual machines of guests on the virtualized program. This invention may be applied to a computer system either of a mainframe system and an open system.

The program is executed by a processor (for example, a CPU) to perform predetermined processes using a memory and a communication port (a communication control device). Accordingly, the sentences having their subjects of "program" in the descriptions of the above embodiments may be replaced with the sentences having the subjects of "processor". Alternatively, the processes executed by a program are the processes executed by the computer or information processing apparatus on which the program runs. For example, the copy control program is a copy controller for controlling copying; a CPU and a computer working according to the copy control program are also copy controllers.

A part or the whole of a program may be implemented by dedicated hardware. The program can be installed in computers by a program distribution server or a computer readable non-volatile storage medium and can be stored in a storage medium in an external non-volatile storage apparatus of each computer.

[Industrial Applicability]

This invention can be applied to copy operations of volumes which have been allocated to virtual machines.

The invention claimed is:

1. A computer system comprising:
a storage apparatus;
a host computer which accesses volumes provided by the storage apparatus; and
a management computer, wherein:
the host computer executes a control program and a guest OS running on the control program;
the guest OS accesses one or more volumes allocated from the storage apparatus;
the storage apparatus performs copy operations of the one or more volumes allocated to the guest OS;
one of the host computer and the management computer executes a copy control program for controlling copy operations by the storage apparatus;

the one of the host computer and the management computer, in accordance with the copy control program, obtains first information indicating at least a part of one or more volumes allocated to the guest OS at a given time from the control program; and the one of the computers, in accordance with the copy control program, compares the first information with second information indicating at least a part of one or more volumes having been allocated to the guest OS prior to the given time to check for a change in volume allocation to the guest OS and performs volume copy control for the guest OS in accordance with a result of the checking.

2. A computer system according to claim 1, wherein the one of the computers receives a copy control command for a volume allocated to the guest OS and performs the checking in response to the receipt of the copy control command.

3. A computer system according to claim 2, wherein the one of the computers obtains the first information in response to the receipt of the copy control command.

4. A computer system according to claim 3, wherein the one of the computers performs the checking in a case that the copy control command instructs the checking.

5. A computer system according to claim 4, wherein:
attributes available for a volume allocated to the guest OS includes a first attribute indicating that the allocation to the guest OS is allowed to be changed in operation and a second attribute indicating that the allocation to the guest OS is not allowed to be changed in operation; and
the first information and the second information are configured with information on all of the volumes which are allocated to the guest OS and have the first attributes.

6. A computer system according to claim 5, wherein:
a copy group which is composed of all of the volumes allocated to the guest OS and is a unit of copy operation in the storage apparatus is defined; and
the second information is information on the copy group.

7. A computer system according to claim 6, wherein the one of the computers determines at least one of existence or non-existence of over or short in volume and existence or non-existence of discrepancy in volume label.

8. A computer system according to claim 7, wherein, if the received copy control command is creating a copy pair and the determination results in existence, the one of the computers performs error handling without issuing a copy control command of creating a copy pair to the storage apparatus.

9. A computer system according to claim 5, wherein:
a copy group which is composed of all of the volumes allocated to the guest OS and is a unit of operation for the one of the computers is defined; and
the second information is information on the copy group; and
the one of the computers excludes a volume which is included in the copy group and is not included in the first information from a target in a case that the one of the computers issues a copy control command for the copy group to the storage apparatus.

10. A method of managing volumes in a storage apparatus in a computer system comprising a host computer which executes a control program and a guest OS running on the control program, the storage apparatus which provides the guest OS with one or more volumes and executes copy operations of the one or more volumes, and a management computer, the method comprising:
executing, by one of the host computer and the management computer, a copy control program for controlling copy operations by the storage apparatus;
obtaining, by the one of the computers in accordance with the copy control program, first information which indicates at least a part of one or more volumes allocated to the guest OS from the control program at a given time;
comparing, by the one of the computers in accordance with the copy control program, the first information with second information which indicates at least a part of one or more volumes having been allocated to the guest OS prior to the given time to check for a change in volume allocation to the guest OS; and
controlling, by the one of the computers in accordance with the copy control program, volume copying for the guest OS in accordance with a result of the checking.

11. A method according to claim 10, wherein the one of the computers receives a copy control command for a volume allocated to the guest OS, obtains the first information in response to the receipt of the copy control command, and performs the checking.

12. A method according to claim 10, wherein:
attributes available for a volume allocated to the guest OS includes a first attribute indicating that the allocation to the guest OS is allowed to be changed in operation and a second attribute indicating that the allocation to the guest OS is not allowed to be changed in operation; and
the one of the computers performs the checking on volumes having the first attribute.

13. A computer-readable storage medium for storing a program for controlling volume copy operations by a storage apparatus in a computer system comprising a host computer that executes a control program and a guest OS running on the control program and a storage apparatus that provides the guest OS with one or more volumes, wherein a process performed by the host computer in accordance with the programs comprises:
obtaining first information indicating at least a part of one or more volumes allocated to the guest OS from the control program at a given time; and
comparing the first information with second information indicating at least a part of one or more volumes having been allocated to the guest OS prior to the given time to check for a change in volume allocation to the guest OS and perform volume copy control for the guest OS in accordance with a result of the checking.

14. A computer-readable storage medium according to claim 13, wherein:
a copy group which is composed of all of the volumes allocated to the guest OS and is a unit of copy operation in the storage apparatus is defined; and
the second information is information on the copy group.

15. A computer-readable storage medium according to claim 13, wherein the process includes determining at least one of existence or non-existence of over or short in volume and existence or non-existence of discrepancy in volume label in the comparing the first information with the second information.

* * * * *